(12) United States Patent
Petersen

(10) Patent No.: US 9,681,652 B2
(45) Date of Patent: Jun. 20, 2017

(54) CLASP HANGER

(71) Applicant: Trece, Inc., Adair, OK (US)

(72) Inventor: John Wesley Petersen, Tulsa, OK (US)

(73) Assignee: Trece, Inc., Adair, OK (US)

( * ) Notice: Subject to any disclaimer, the term of this patent is extended or adjusted under 35 U.S.C. 154(b) by 216 days.

(21) Appl. No.: 14/598,969

(22) Filed: Jan. 16, 2015

(65) Prior Publication Data
US 2015/0237841 A1 Aug. 27, 2015

Related U.S. Application Data

(60) Provisional application No. 61/943,471, filed on Feb. 23, 2014.

(51) Int. Cl.
| | |
|---|---|
| *A01M 1/00* | (2006.01) |
| *A01M 1/20* | (2006.01) |
| *A01M 1/24* | (2006.01) |
| *A47G 29/00* | (2006.01) |
| *A01M 1/02* | (2006.01) |
| *F16M 13/02* | (2006.01) |

(Continued)

(52) U.S. Cl.
CPC ............... *A01M 1/02* (2013.01); *A01M 1/00* (2013.01); *A01M 1/106* (2013.01); *A01M 1/20* (2013.01); *A01M 1/205* (2013.01); *A01M 1/2055* (2013.01); *A01M 1/24* (2013.01); *A01M 17/006* (2013.01); *A47G 29/00* (2013.01); *F16M 13/022* (2013.01); *Y10T 29/49826* (2015.01)

(58) Field of Classification Search
CPC . A01M 1/00; A01M 1/20; A01M 1/24; A47G 29/00

USPC .............. 43/107, 114, 115, 124, 131, 132.1; 24/343, 349; 248/304, 305, 339, 340
See application file for complete search history.

(56) References Cited

U.S. PATENT DOCUMENTS 490,224 A * 1/1893 Campbell ................ A24B 1/08
248/340
1,230,438 A * 6/1917 Sloan ....................... A47G 1/16
24/343

(Continued)

OTHER PUBLICATIONS

PCT/US2015/016683 International Search Report and Written Opinion, mailed May 20, 2015.

*Primary Examiner* — David Parsley
(74) *Attorney, Agent, or Firm* — Royse Law Firm, PC

(57) ABSTRACT

Disclosed herein is a clasp hanger for hanging. The clasp hanger includes a hanger hook comprised of an elongated part. The hanger hook has a hanger hook section and a neck section opposite the hook section. The neck section is expandable to allow the clasp hanger to be quickly hung on a support object such as a branch. The clasp hanger further includes an object attachment device attached to the neck section of the hanger hook. This object attachment device is configured for attaching an object to be hung. The object may be, for example, configured to dispense a chemical or formulation useful in agricultural pest management. The hanger hook, and object attachment device are disposed such that, after the support object is pushed through the neck, the hanger hook will automatically rotate such that the support object is disposed at an interior part of the hanger hook that is away from the neck section. This prevents the support object from passing back through the neck section.

3 Claims, 9 Drawing Sheets

(51) Int. Cl.
*A01M 17/00* (2006.01)
*A01M 1/10* (2006.01)

(56) References Cited

U.S. PATENT DOCUMENTS

| | | | | |
|---|---|---|---|---|
| 2,086,928 | A * | 7/1937 | Tiryakian | A47G 29/08 248/217.4 |
| 2,562,532 | A | 10/1950 | Bedford, Jr. | |
| 3,729,858 | A * | 5/1973 | Bradshaw | A01M 1/145 43/114 |
| 3,755,958 | A * | 9/1973 | Bradshaw | A01M 1/02 43/114 |
| 4,410,115 | A * | 10/1983 | McClain, Jr. | B62J 11/00 224/268 |
| 4,887,785 | A * | 12/1989 | Blaich | A01K 39/00 24/716 |
| 5,314,151 | A | 5/1994 | Carter-Mann | |
| 5,383,301 | A * | 1/1995 | Babb | A01M 1/14 43/114 |
| 5,575,446 | A * | 11/1996 | Swenson | A47G 33/10 248/304 |
| 6,036,051 | A * | 3/2000 | Benjamin | A01K 97/06 221/185 |
| 6,708,445 | B1 * | 3/2004 | Israely | A01M 1/02 43/131 |
| 8,240,081 | B2 * | 8/2012 | Cuellar Bernal | A01M 1/026 43/107 |
| 8,793,927 | B2 * | 8/2014 | Winkler | A01M 1/02 43/107 |
| 2011/0116977 | A1 | 5/2011 | Yamamoto et al. | |

\* cited by examiner

CLASP HANGER

CROSS-REFERENCE TO RELATED APPLICATIONS

This application claims priority to and benefit of U.S. provisional patent application Ser. No. 61/943,471 filed Feb. 23, 2014, the disclosure of which is hereby incorporated herein by reference for all purposes.

BACKGROUND

Technical Field

The disclosure herein relates to a clasp hanger for hanging an object.

Related Art

Certain chemicals and formulations used in agricultural and non-agricultural pest management, which includes monitoring and control, may require periodic or continuous dispersal during certain times of the growing season in order to effectively manage pests. Examples of such chemicals and formulations are provided in U.S. Pat. No. 6,264,939, to Light, et al. Pest control can be achieved by use of dispersal devices, containers, and traps attached by a wire, hook, string, or other means to trees or bushes, by periodic spraying of trees or bushes, or by other methods known in the art of pest management. An example of a device attachable to a tree is provided in U.S. Pat. No. 6,516,558, to Lingren, et al. Another example of a device attachable to a crop is provided by U.S. Pat. No. 6,393,760. U.S. Pat. Nos. 6,264,939; 6,516,558; and 6,393,760 are hereby incorporated by reference in their entirety for all purposes.

SUMMARY

Disclosed herein is a clasp hanger for hanging of an object. The clasp hanger is comprised of a hanger hook configured to be hooked onto a supporting object such as a branch, and an object attachment device configured for hanging an object such as a pest management device. The hanger hook includes a neck section configured to expand to accept the supporting object as the hanger hook is attached thereto. The object attachment device is disposed relative to the hanger hook such that, once the object or branch is within the hanger hook, the hanger hook is automatically rotated by the force of gravity. This orients the clasp hanger such that the neck section is below the object or branch, and the clasp hanger is securely attached to the branch. The clasp hanger is typically comprised of one or more elongated parts. The hanger hook and the object attachment device are optionally configured together from a single elongated part. The hanger hook has a hook section and a neck section disposed opposite the hook section. The neck section is made up of two parts disposed on either side of the elongated part that makes up the hook section. At the end of the neck section farthest from the hook section is an entrance channel where a branch, for example, enters and moves by force through the neck section into the interior hook section.

Various embodiments of the invention include a clasp hanger for hanging of an object, comprising a hanger hook and an object attachment device. The hanger hook includes a hook section and a neck section, the hook section having a center axis and an interior hook section having an interior hook size that is greater than an opening of the neck section, wherein the neck section is configured to expand when the opening of the neck section is pushed against a support structure. The object attachment device is configured to support the object during rotation of the clasp hanger, the neck section being disposed between the object attachment device and the hook section, the object attachment device being further configured such that the neck section hangs below the hook section when the clasp hanger is hung from the support structure, the object attachment device being disposed outside of the center axis, the object resting by action of gravity in a retention section of the object attachment device when the clasp hanger is oriented to have the neck section above the hook section.

Various embodiments of the invention include an insect control device comprising a hanger hook, an insect control object and an object attachment device. The hanger hook includes a hook section and a neck section, the hook section having a center axis and an interior hook section having an interior hook size that is greater than an opening of the neck section, and is configured to expand when pushed against a support structure. The insect control object is configured to dispense a chemical or chemical formulation; the chemical or chemical formulation is active in insect control. The object attachment device is configured to connect the insect control object to the hanger hook during rotation of the clasp hanger, the neck section being disposed between the object attachment device and the hook section, the object attachment device being further configured such that the neck section hangs below the hook section when the clasp hanger is hung from the support structure.

Various embodiments of the invention include a method of attaching an insect control device to a support, the method comprising engaging a clasp hanger to a support object, the clasp hanger including a hanger hook, an object attachment device and an insect control object, the insect control object being connected to the hanger hook by the object attachment device, the clasp hanger being engaged at a neck of the hanger hook from below the support object; pushing the clasp hanger toward the support object such as the support object passes through the neck of the hanger hook into an interior hook section of the hanger hook, the neck expanding to allow passage of the support object; releasing the clasp hanger such that the clasp hanger is free to rotate around the support object; and rotating the clasp hanger around the support object, the rotation resulting in the movement of the support object to a region of the hanger hook opposite the neck of the hanger hook, the rotation resulting automatically from the force of gravity on the object attachment device and the insect control object. The rotation of the clasp hanger typically results in the insect control object sliding from a first region of the object attachment device to a second region of the object attachment device without reaching a gap in the object attachment device.

DETAILED DESCRIPTION

Figure 1:
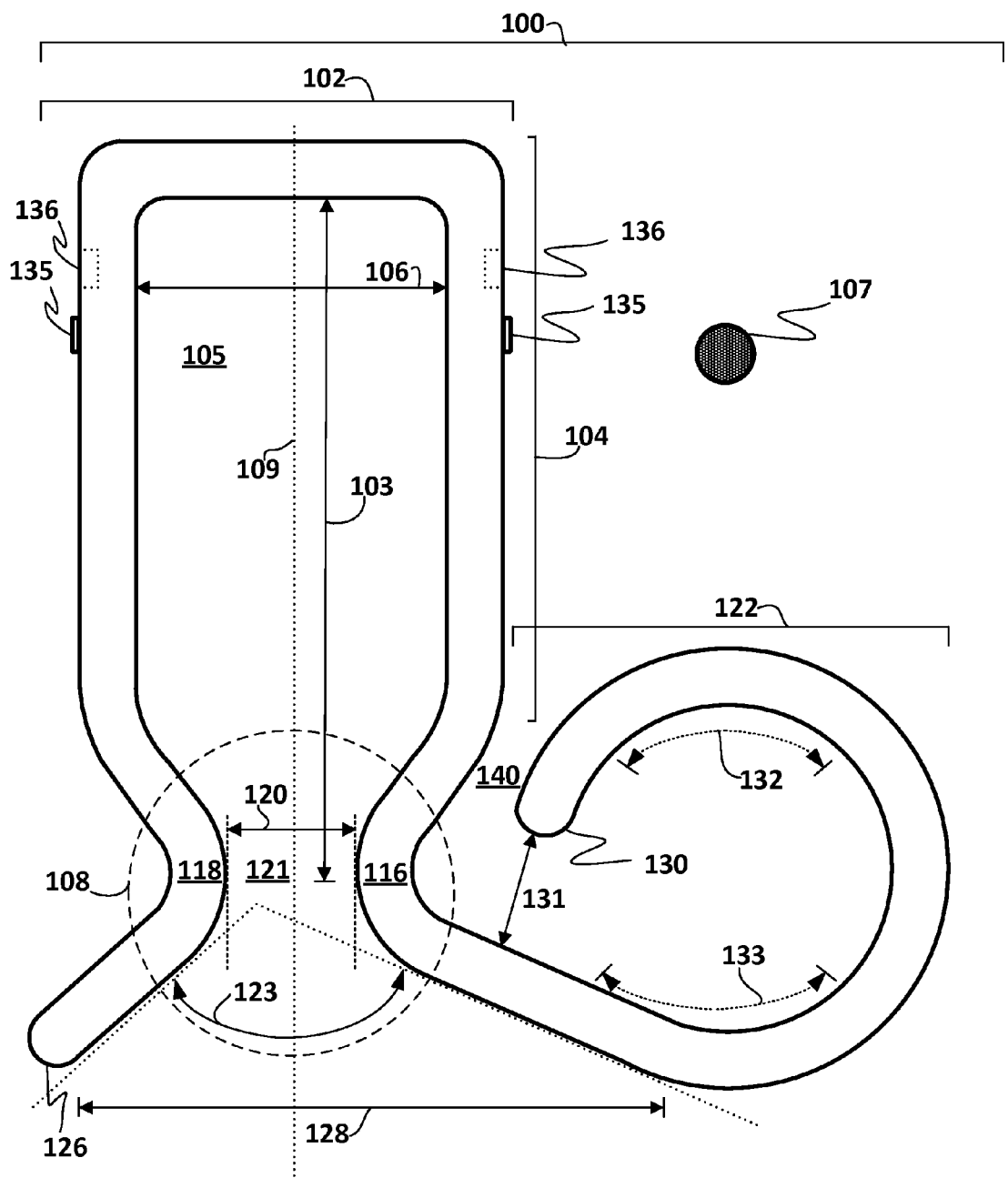
FIG. 1 provides an embodiment of a clasp hanger without an object attached to the clasp hanger.

Disclosed herein is a clasp hanger for hanging of an object attached to the hanger. FIG. 1 provides an embodiment of a clasp hanger 100 without an object attached to the clasp hanger 100. The clasp hanger 100 has a hanger hook 102 comprised of one or more elongated parts connected together. The hanger hook 102 has a neck section 108 and hook section 104. The hook section 104 bounds an interior region referred to as an interior hook region 105 characterized by an interior hook size 106 and a vertical size 103. The vertical size 103 is the distance between the center of the neck section 108 and the opposite point of the hook section 104 through the center of the hook section 104. The interior hook size 106 is the largest distance within the interior hook section 104 perpendicular to a line of the vertical size 103. While the size of clasp hanger 100 may vary widely for different applications, in various embodiments the interior hook size 106 is between ½ and 3 inches, between 1 and 2.5 inches, between ½ and 4 inches, or less than 6 inches in length. In various embodiments the vertical size 103 is between 1 and 3 inches, ½ and 4 inches, or between ½ and 5 inches. Other lengths of the interior hook size 106 and vertical size 103 are possible.

The neck section 108 comprises a right neck region 116 and a left neck region 118, (the right and left designations being arbitrary and for illustrative purposes only). The right neck region 116 and the left neck region 118 are disposed on opposite ends of the hook section 104. The right neck region 116 and the left neck region 118 form a neck 121 that restricts access to interior hook section 105. The distance 120 between the right neck region 116 and the left neck region 118 may vary widely in different applications. The right neck region 116 and the left neck region 118 may even overlap (e.g., be measured as a negative value). In various embodiments the right neck region 116 and left neck region 118 may be vertically offset, offset from the plane of the page (shown in FIG. 1), or offset in both these ways. The distance 120 is less than the interior hook size 106. Unless otherwise noted, the distances discussed herein refer to an unstrained state of clasp hanger 100.

The clasp hanger 100 is comprised of one or more flexible materials allowing forcible increase of the distance 120 to allow passage of a support object through the neck 121 between the right neck region 116 and the left neck region 118. Once within the interior hook section 105, the support object is at least partially held within the interior hook section by closing of the neck 121 to the unstrained distance 120.

The clasp hanger 100 further comprises an object attachment device 122 connected to the right region 116 of the neck section 108. The object attachment device 122 is configured to hold an object for hanging. A region between a left end 126 of the hanger hook 102 and the object attachment device 122 forms an entrance channel 128. The entrance channel 128 is defined as the region over which a supporting object would be guided to the neck 121 (and vice versa) during the attachment process discussed elsewhere herein. The entrance channel 128 is greater than the opening of the neck section distance 120. In various embodiments, the entrance channel is between 1 and 3 inches, between ½ and 4 inches, or between ½ and 2 inches in length, although other lengths are possible.

The hook section 104 has a center axis 109, shown in FIG. 1 as a dotted line passing through the interior hook section 105 and the neck 121. The center axis 109 is defined as passing through a center point of the hook section 104 (e.g., center at the hook size 106) and a center point of the opening of the neck 121. Typically, the object attachment device 122 is disposed outside of the center axis 109, in other words, the center axis 109 does not intersect the object attachment device 122. This facilitates attachment of the clasp hanger 100 to a support object, as the opening of the neck 121 is not obstructed by the object attachment device 122. The object attachment device 122, thus, contributed to the length of the entrance channel 128 rather than reducing it.

In some embodiments, the right neck region 116 and the left neck region 117 touch each other in the unstrained state of hanger hook 102. In these embodiments opening of the neck section distance 120 is zero (or less where they the right and left regions overlap). In some embodiments, the entrance channel 128 and the opening of the neck section distance 120 are approximately the same. In typical embodiments, the opening of the neck section distance 120 is selected to be less than an expected diameter of the support object. By way of example and not by limitation, support objects include the following: branch, limb, rod, cable, vines, trellis, bush, chain, wire, fence, stalk, and the like. Clearly, such support objects may vary in size. Different embodiments of clasp hanger 100 may be sized for attachment to different ranges of support object size. In various embodiments, the opening of the neck section 120 is from about zero up to about six inches, from about one quarter inch to about three inches, or from about one half inch to about an inch and a half.

The materials used for the clasp hanger 100 are selected based on use of the clasp hanger 100. The weight of the object to be hung is a factor that may be considered. Other factors considered include the size of the support object from which the clasp hanger 100 is to be hung. In various embodiments, the effective cross-section or diameter of the elongated part forming the clasp hanger can be a ¼ inch or less or can be less than ½, 1 or 2 inches. Other sizes are possible. In some embodiments, the effective cross-section is curvilinear and is about a quarter inch to about a half inch in diameter, and the material is comprised of a biodegradable plastic. In some embodiments, the effective cross-section is about a tenth of an inch and the material is a metal wire. Numerous other combinations of effective cross-sections and materials may be selected based on the intended of use of the clasp hanger 100.

In various embodiments, the interior hook size 106 is so dimensioned to be larger than the branch of an agricultural tree or bush. In various embodiments, the interior hook size 106 is so dimensioned to be larger than the branch of a non-agricultural tree or bush, including ornamental trees or bushes and non-ornamental trees or bushes, and further including farmed, landscaped, planted, or wild trees or bushes. In various embodiments, the vertical size 103 is the same size as the interior hook size 106. In various embodiments, the vertical size 103 is larger or smaller than the interior hook size 106. Typically, the interior hook size 106 and the vertical size 103 are selected to be greater than the support object effective diameter so that the clasp hanger 100 can freely rotate by action of gravity after hanging on the support object.

In various embodiments, the one or more elongated parts are substantially in one plane. In various embodiments, portions of the one or more elongated parts lie in two or more planes. In various embodiments, the two or more planes are substantially parallel. In various embodiments, at least two of the two or more planes are not parallel to each other. For clarification and as an example and not by limitation, the embodiment of FIG. 1 can have one or more of the sections 104, 108 and the object attachment device 122 of the clasp hanger 100 out of the plane of the paper.

In various embodiments and by way of example and not by limitation, the hanger hook 102 has a shape that is curvilinear, rectangular, rectilinear, and angular, and combinations thereof. Different parts of the hanger hook 102, including each section, can be comprised of different shapes and combinations of different shapes. By way of example and not by limitation, the neck section 108 and the hook section 104 can be comprised of angular shapes. In various embodiments, the shape of the hanger hook 102 is curvilinear. In various embodiments, the shape of the hanger hook 102 includes various combinations of two or more of curvilinear, angular, and rectilinear shapes. The hanger hook 102 typically has a different shape than the object attachment device 122. As such, the clasp hanger is asymmetric in the view of FIG. 1.

In various embodiments and by way of example and not by limitation, the clasp hanger 100 has a cross sectional shape that is circular, square, rectangular, rectilinear, triangular, polygon, elliptical, and geometric, and combinations thereof. Different sections, regions, and devices of the clasp hanger 100 can have different cross sections in the same embodiment. In various embodiments, the elongated parts have a cross sectional shape that is substantially circular as shown by a cross section 107 in FIG. 1. The left end 126 and a second end 130 can be any number of shapes including without limitation curvilinear, circular, flat, angular, and rectangular, and combinations thereof.

In various embodiments and by way of example and not by limitation, the elongated part is comprised of a material selected from the group consisting of plastic, rubber, PVC, biodegradable material, wood, paper, composite, and metal, and combinations thereof. For example, the material may include biodegradable plastic or cellulose. Clasp hanger 100 may include one or more chemicals selected for the control of insects.

In various embodiments, the hanger hook 102 has one or more indentations 136 or protrusions 135 for attachment of the clasp hanger 100 to a hanging device. The hanging device increases reach for hanging the clasp hanger. The indentations 136 or protrusions 135 are shown in FIG. 1 and can be shaped and sized according to the size of the clasp hanger 100 and the hanging device. In various embodiments, the indentations 136 or protrusions 135 are near the top of the hook section 104 and on an outer surface of the hook section 104. In various embodiments, the clasp hanger has a combination of indentations and protrusions arranged on the clasp hanger 100. The indentations or protrusions can be any shape suitable for engagement in the hanging or holding device for attachment of the clasp hanger 100 to an attachment object.

In various embodiments, the object attachment device 122 is selected from the group consisting of a circular part, a curvilinear part, a rectangular part, a rectilinear part, a mechanical clip, a paper clip, a clasp, a hook, a spring-type clasp, and a hanger body, and combinations of thereof. Alternative structures are possible.

In various embodiments, the object attachment device 122 includes or has attached to it a dispenser for dispensing a chemical or formulation. In various embodiments, the dispenser is a piece of porous material containing the chemical or formulation to be dispersed by evaporation and/or contact, an electromechanical dispenser containing the chemical or formulation to be dispersed at selected times into the air or onto a material attached to the clasp hanger or dispenser, a strip of material containing the chemical or to be dispersed by evaporation or contact and having an opening for attachment to the object attachment device. In various embodiments, the dispenser is comprised of a biodegradable material. In various embodiments, the dispenser dispenses the chemical or formulation by evaporation and/or by contact with a pest. The chemical or formulation can attract, kill, and/or interfere with the reproduction of certain pests targeted for elimination or control. Dispensing further includes simply making the chemical or formulation available for consumption by a pest or for making contact with a pest.

In various embodiments, the chemical is a fragrance, scent, semiochemical, sex pheromone, kairomone, kairomone attractant derived from pear or apple, allomone, insecticide, pesticide, bisexual attractant, aggregant, arrestant, ethyl (3E,4Z)-2,4-decadienoate or an isomer or a derivative thereof, alkyl (3E,4Z)-2,4-decadienoate or an isomer or a derivative thereof, or purified compounds isolated from a pear extract including isomers and derivatives purified up to at least 90% purity, and combinations thereof. These materials are optionally included within one or more parts of clasp hanger 100.

In various embodiments, the object attachment device 122 is disposed relative to the hanger hook 102 to provide the clasp hanger 100 with a center of mass outside the hanger hook 102 such that the clasp hanger 100 rotates to hang from the hook section 104 rather than the neck 121 when hung on a support object. (The support object having an effective diameter less than the interior hook size 106 and vertical size 103 to allow the rotation.) In this position, the support object is away from the neck 121 and the clasp hanger 100 is, thus, prevented from detaching from the support object. Further, the object attachment device 122 and optional dispenser are below the hook section 104. For clarity, the object attachment device 122 is disposed such that, if the hook section 104 is below the neck 121, the weight(s) of the object attachment device 122 and/or an object attached to the object attachment device 122 will cause the clasp hanger 100 to rotate such that the hook section 104 is above the neck 121. This allows the clasp hanger 100 to be attached to a branch of a tree with the neck section 108 above the hook section 104 and, when released, the clasp hanger 100 will rotate such that the hook section 104 surrounds the branch and is above the neck section 108. This prevents the hanger hook 102 from sliding off from the branch by means of the branch passing back through the neck 121.

In various embodiments, the curvilinear part, the rectangular part, or the rectilinear part forming the object attachment device 122 has a retention section having a different cross-sectional shape. This retention section is within a first region 132, a second region 133 or there between. The shape could be an increase in cross sectional area. The shape could be a knob extending from the surface or a series of knobs. The shape prevents a dispenser from falling off from the object attachment device 122 during and/or after attachment of the clasp hanger 100 to a support object. The dispenser optionally has a hole so dimensioned and shaped to prevent the dispenser from sliding off after the dispenser has been slid onto the object attachment device 122.

The clasp hanger 100 is further characterized by an acceptance angle 123 in the clasp region 121. The acceptance angle 123 is the angle over which an impinging support object 250 will be guided to the opening of neck section 120 and over which entrance to the clasp region 121 is not obstructed by the object attachment device 122. In various embodiments acceptance angle 123 is at least 45, 60, 90, 120, 160 or 170 degrees. The acceptance angle 123 optionally includes a vertex at the center of neck section 120.

Figure 2:
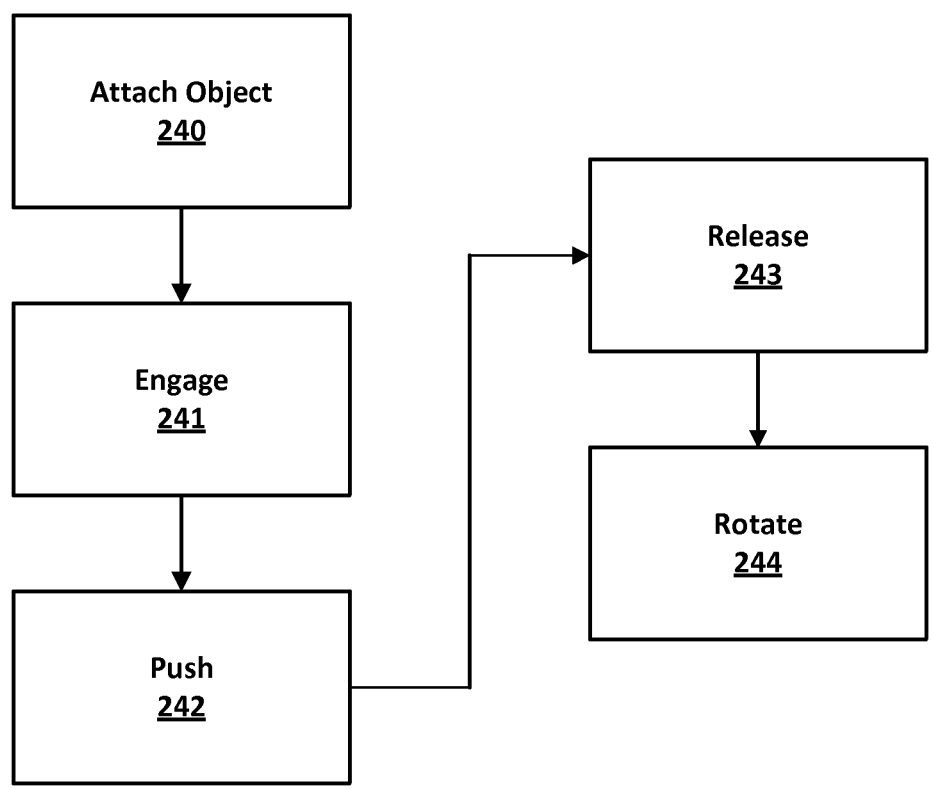
FIG. 2 provides an embodiment of a method of attaching a clasp hanger to an attachment object.
Figure 3A:
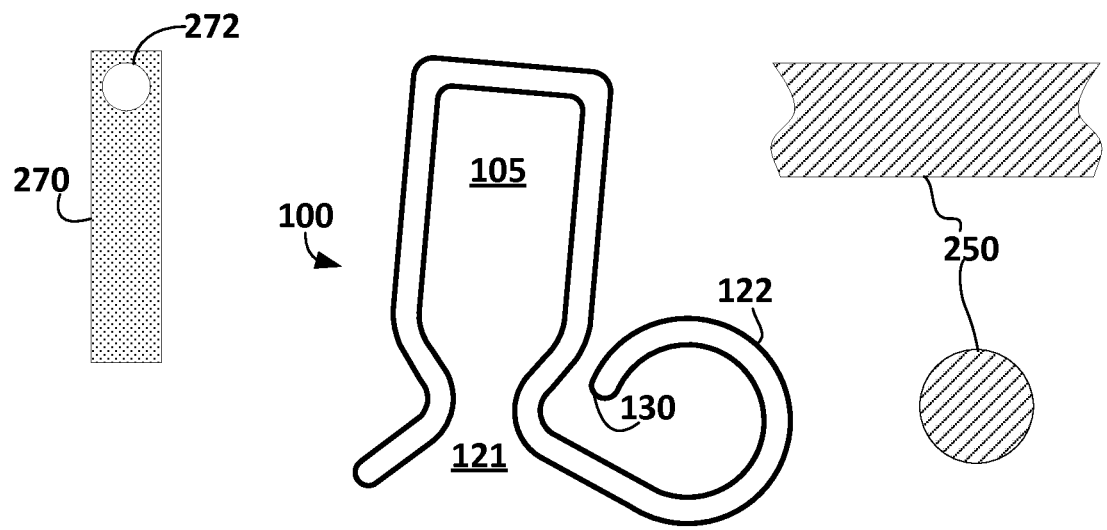
FIG. 3A provides an example of the clasp hanger and an object to be attached to a support object.

FIG. 2 provides an exemplary embodiment of a method of attaching a clasp hanger to an attachment object. In an optional attach object step 240, an object is attached to the clasp hanger. FIG. 3A provides an example of the clasp hanger 100 and a hanging object 270 to be attached to a support object. Referring to FIG. 3A, an embodiment of the clasp hanger 100 is shown for hanging from a support object 250, shown in two views. Support object 250 may be, for example, a wire, branch, limb, fence part, rope, pipe, and/or the like. The hanging object 270 is shown with an optional hole 272. The clasp hanger 100 has an interior hook section 105, a neck 121, an object attachment device 122, and a second end 130. The object 270 is shown as a rectangular part by way of example. The object can be any number of shapes as disclosed previously. In various embodiments the hanging object 270 includes the dispenser discussed elsewhere herein. Step 240 and the hanging object 270 are optional in embodiments in which the dispenser is included as part of clasp hanger 100.

By way of example and not limitation, the object attachment device 122 is shown as a curvilinear part. The object attachment device 122 can be any of the shapes or devices disclosed previously. By way of example and not by limitation, the clasp hanger 100 is shown as an elongated part in a curvilinear shape. The clasp hanger 100 can be any of the shapes or combination of shapes disclosed herein.

Figure 3B:
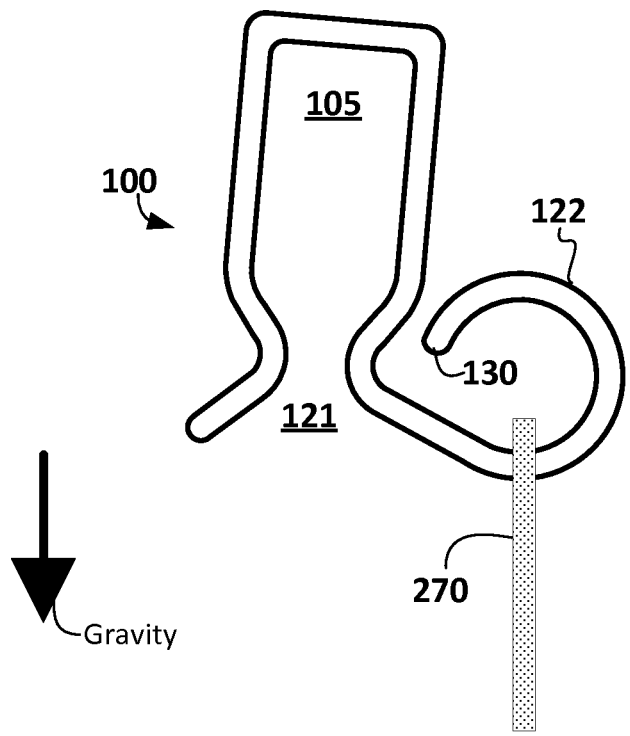
FIG. 3B provides an example of an object attached to a clasp hanger ready for attachment to a support object by expanding the clasp region over the support object by force.

FIG. 3B provides an example of a the hanging object 270 attached to the clasp hanger 100 ready for attachment to a support object 250 by expanding the neck 121 over the support object 250. The hanging object 270 is attached to the object attachment device 122 by sliding the hanging object 270 over the second end 130 through hole 272. The hanging object 270 is shown attached to the object attachment device 122 with the elongated part through hole 272. The hanging object 270 is at the lowest point of the object attachment device 122 by force of gravity.

Figure 3C:
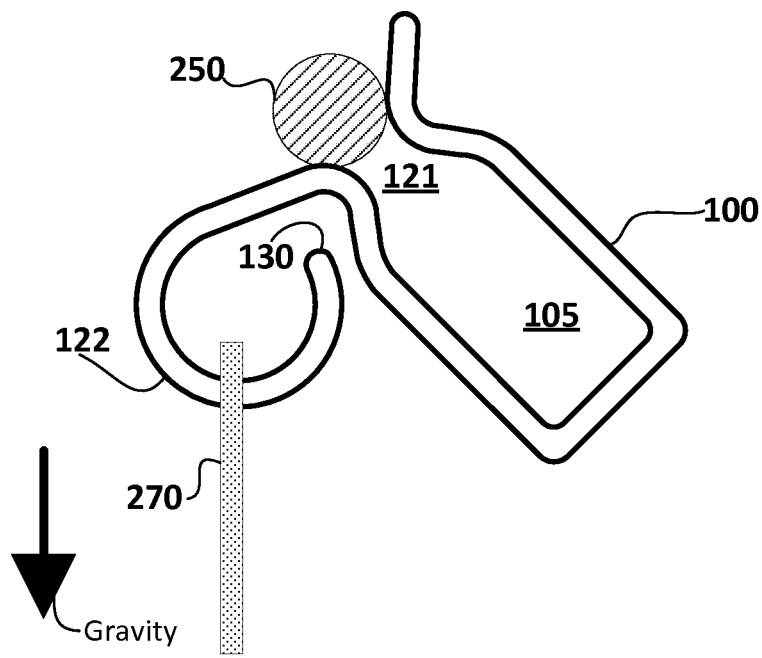
FIG. 3C provides an example of a clasp hanger with an object attached thereto and in preparation for being attached to a support object by expanding the clasp region over the support object by force.

Referring again to FIG. 2, in an engage step 241 the clasp hanger 100 is engaged upon the support object 250 at the entrance channel 128. FIG. 3C provides an example of the clasp hanger 100 with a hanging object 270 attached thereto and engaged to support object 250 at entrance channel 128. The clasp hanger 100 is engaged by being held with neck 121 above hook section 104 at an angle for attachment to the support object 250. The hanging object 270 has slid to a different resting point on the object attachment device 122 by force of gravity. The support object 250 is shown in cross section and engaged within the entrance channel 128.

Figure 3D:
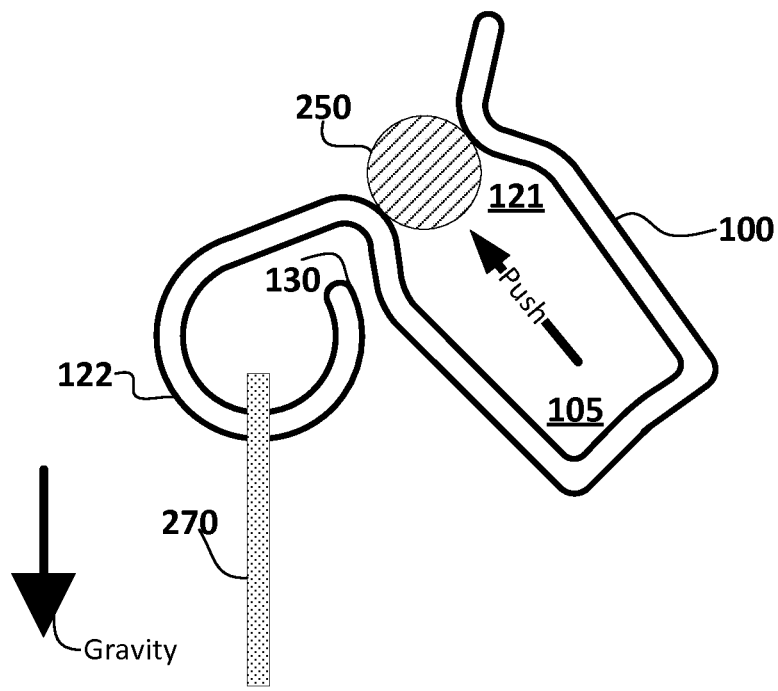
FIG. 3D provides an example of a clasp hanger with a hanging object attached thereto shown during expansion of the clasp region.

In a push step 242 of FIG. 2, the clasp hanger 100 is pushed over the attachment object 250 by use of force to expand the neck 121. FIG. 3D provides an example of the clasp hanger 110 with a hanging object 270 attached thereto during push step 242. Note the expansion of the neck 121 as the support object 250 passes through neck region 108.

Figure 3E:
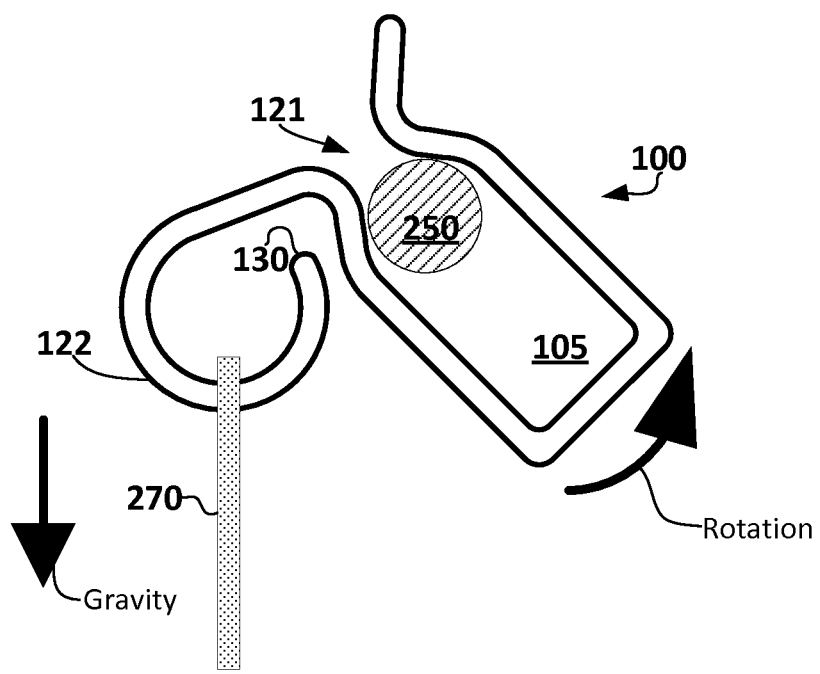
FIG. 3E provides an example of a clasp hanger with a hanging object attached thereto shown after expansion of the clasp region but before action of gravity rotating the clasp hanger to its natural hanging position. A support object is shown in cross section is in the interior of the clasp hanger.

In a release step 243 of FIG. 2, the clasp hanger 100 is released after the attachment object 250 has passed through the neck 121 to the interior hook section 105 of the clasp hanger 100. FIG. 3E provides an example of a clasp hanger 100 and a hanging object 270 attached thereto shown after expansion of the neck but before action of gravity causes rotation of the clasp hanger 100 to its natural hanging position. The attachment object 250 shown in cross section is in the interior hook section 105.

Figure 3F:
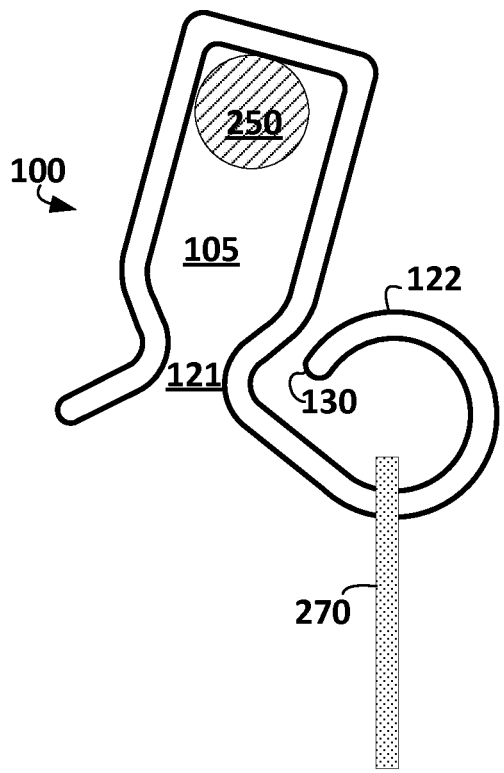
FIG. 3F provides an example of a clasp hanger hanging from a support object and with a hanging object attached to the clasp hanger, following rotation.

In a rotate step 244 of FIG. 2, the action of gravity rotates the clasp hanger 100 to a natural resting position. FIG. 3F provides an example of this position. Action of gravity provides a hanging position with the neck 121 disposed below the support object 250 and provides a hanging position of the hanging object 270 at approximately the lowest point on the object attachment device 122. In transitioning from the states illustrated in FIG. 3E and FIG. 3F, the clasp hanger 100 is released and gravity rotates the clasp hanger 100 around the support object 250 so that the support object 250 is at the top of the interior hook section 105. In addition, the object 270 has slid on the object attachment device 122 back to the lowest point of object attachment device 122 by force of gravity. The clasp hanger 100 typically cannot be removed from the support object 250 without an external force lifting the entire system, re-expanding the neck 121 and pushing the clasp hanger off from the support object 250. The attachment is, thus, secure.

Referring again to FIG. 1, prior to attachment, when the clasp hanger 100 is orientated such that the neck section 108 is disposed above the hook section 104, the hanging object 270 to be attached rests by action of gravity in approximately a first region 132 of the object attachment device 122. (Typically, the object 270 to be attached is free to slide along object attachment device 122 so it rests at the lowest available point.) This orientation is illustrated in FIGS. 3C and 3D. The term "pre-attachment orientation" is hereby defined herein as the orientation illustrated in FIGS. 3C and 3D and, as defined, the positioning of the neck section 108 above the hook section 104 is inherent to the term.

After attachment, clasp hanger 100 rotates such that the clasp hanger 100 is oriented to have the neck section 108 below the hook section 104. This rotation is illustrated in FIGS. 3E and 3F. When the rotation is complete, as illustrated in FIG. 3F, the object attachment device 122 is disposed such that under the influence of gravity the object 270 being hung would naturally rest at approximately the second region 133 of object attachment device 122. In various embodiments, the rotation is more than 20, 45, 90, 120 or 180 degrees. The term "attached orientation" is hereby defined herein as the orientation illustrated in FIG. 3F and, as defined, the positioning of the neck section 108 below the hook section 104 is inherent to the term. Note that the hanging object 270 does not reach a gap 140 while traveling between the first region 132 and the second region 133. In both orientations, the hanging object 270 is kept from reaching the gap 140 and is thus held securely to object attachment device 122 before, during and after the rotation. Gap 140 includes an opening or space through which hanging object 270 can be attached to object attachment device 122. Object attachment device 122 is optionally configured such that, in the various orientations illustrated in FIGS. 3B-3F, and the transitions there between, second end 130 is never the lowest point of clasp hanger 100 or object attachment device 122. Object attachment device 122 is configured thus by having sufficient length and arc of curvature.

In various embodiments, the second end 130 is disposed to be at least ¼, ½, ¾ or 1 inches (along the length of object attachment device 122) from a position with the first region 132 at which the object would naturally hang in the state of clasp hanger 100 at which neck section 108 is directly above hook section 104 (e.g., centerline 109 is vertical). Second end 130 is optionally in contact with hanger hook 102 and as such Gap 140 may require tension be applied to object attachment device 122 to have a non-zero length.

Figure 4:
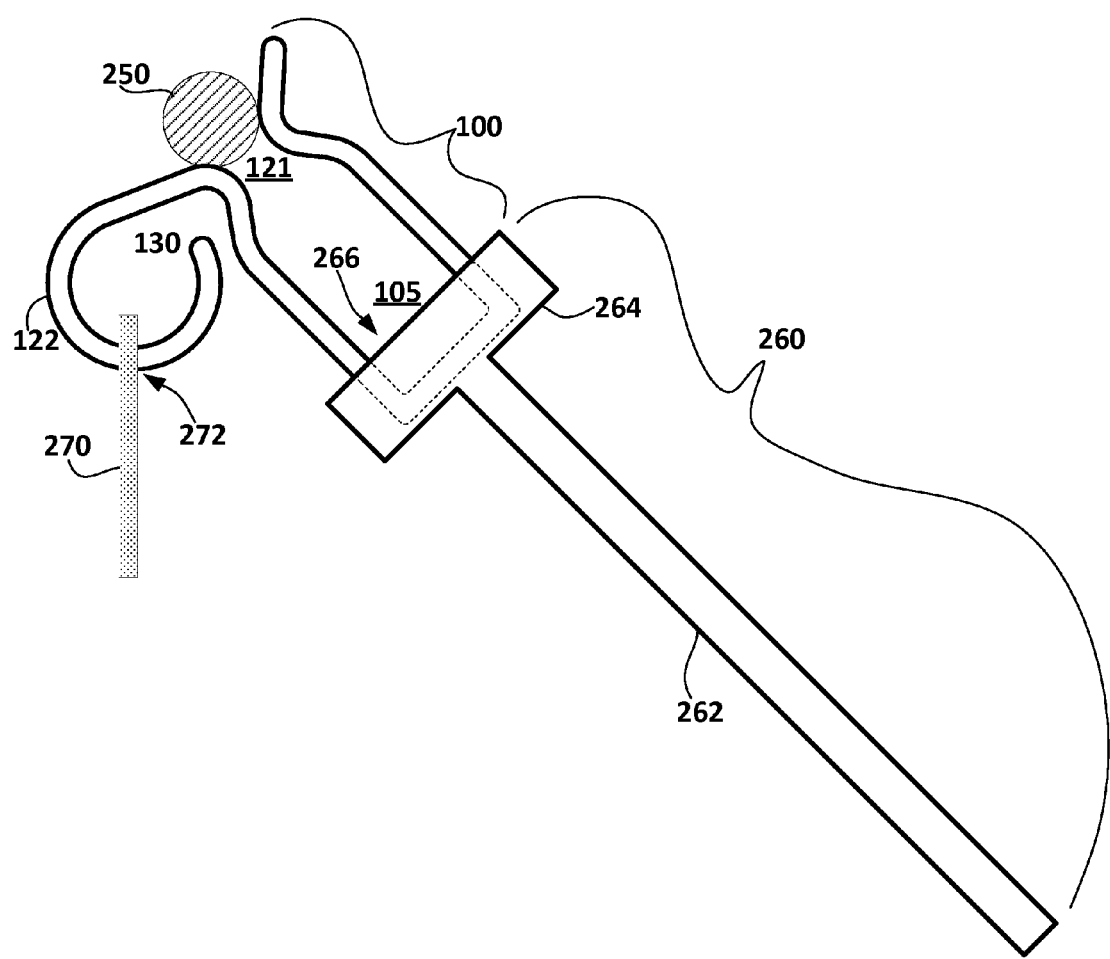
FIG. 4 provides an example of a clasp hanger held in a hanging device and about to be hung onto a support object shown in cross section.

FIG. 4 provides an example of a clasp hanger 100 held in a hanging device 260 and about to be hung onto a support object 250 shown in cross section. The hanging device 260 increases reach beyond arms reach and can provide more secure hanging by holding the clasp hanger in a position advantageous for attachment. FIG. 4 illustrates another embodiment of engage step 241 of FIG. 2. The clasp hanger 100 is inserted into a holder device 260 having a handle 262, an attachment head 264, with an attachment point 266. In this embodiment holder device 260 is configured to hanging support object 250 at a height that would be out of arms reach without holder device. For example, this embodiment can be used to attach the clasp hanger 100 to a high tree branch. The holder device 260 can hold the clasp hanger 100 in a position advantageous and more secure for attachment.

The force necessary to remove the holding device 260 from the clasp hanger 100, after the clasp hanger 100 is attached to the support object 250, is less than the force required for re-expansion of the neck 121 to remove the clasp hanger 100 from the support object 250. Clasp hanger 100 is optionally attached to holder device 260 using indentations 136 and/or protrusions 135.

Figure 5A:
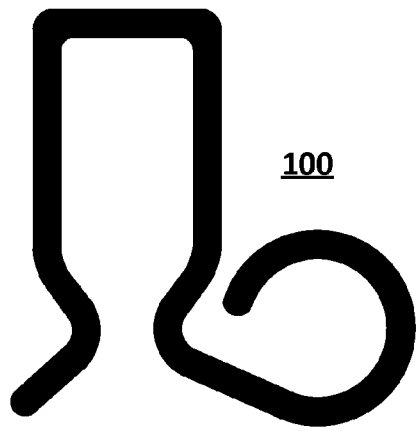
FIGS. 5A-5O provide embodiments of clasp hangers having various alternative shapes.
Figure 5B:
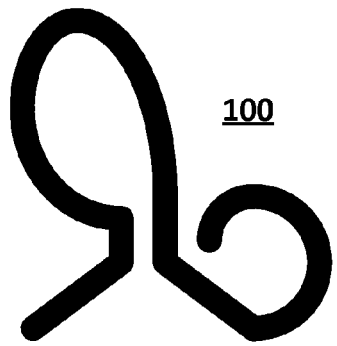
Figure 5C:
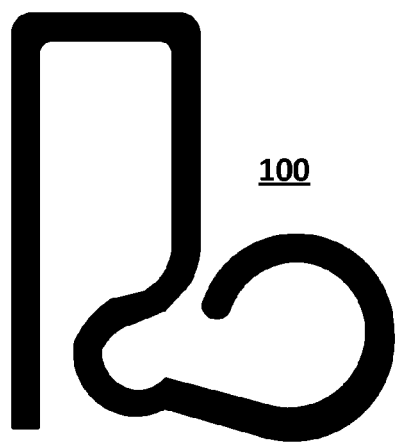
Figure 5D:
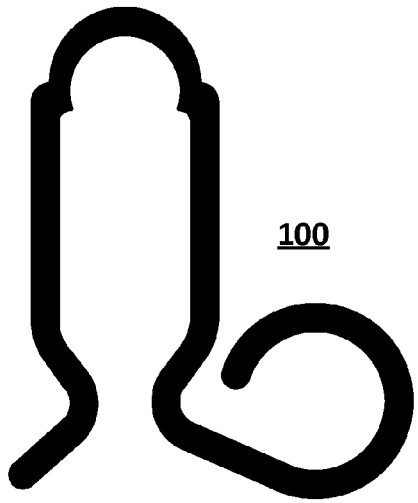
Figure 5E:
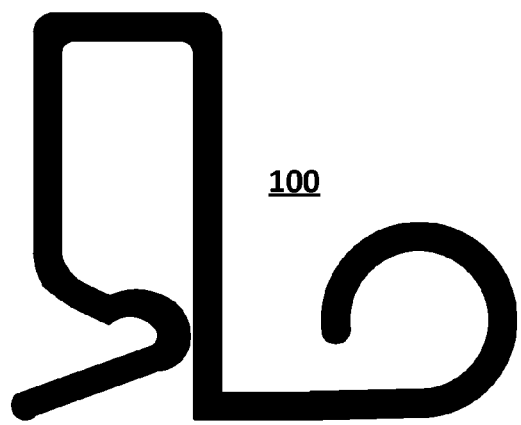
Figure 5F:
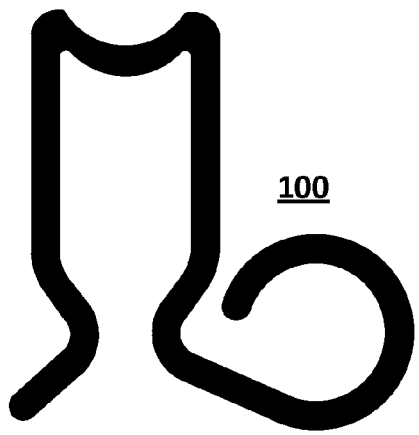
Figure 5G:
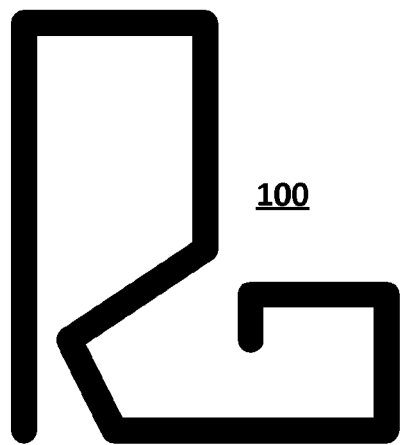
Figure 5H:
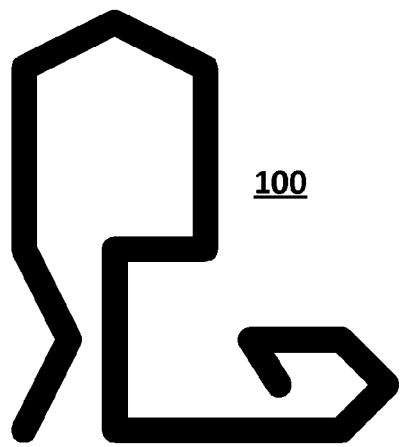
Figure 5I:
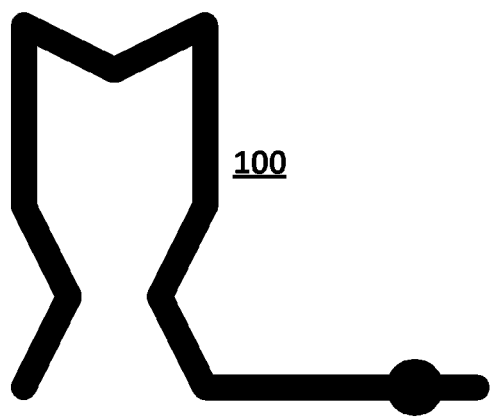
Figure 5J:
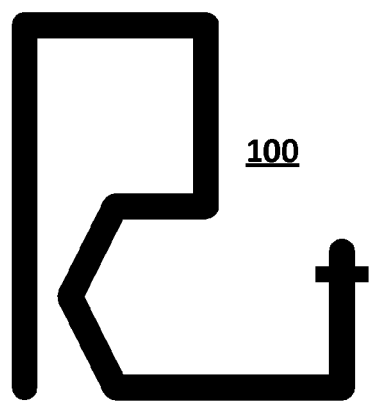
Figure 5K:
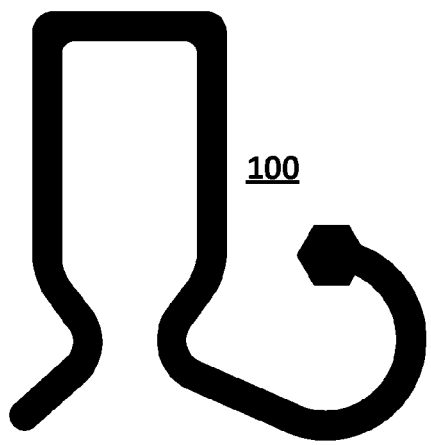
Figure 5L:
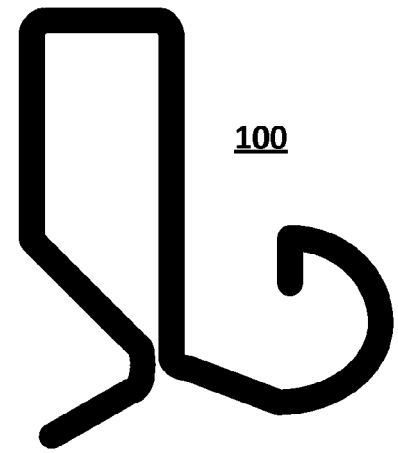
Figure 5M:
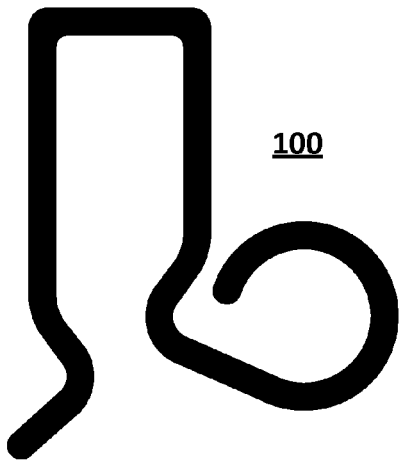
Figure 5N:
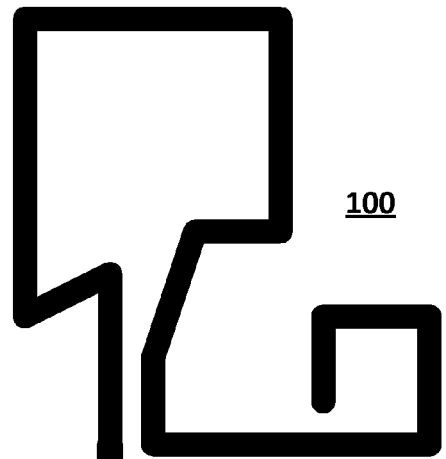
Figure 5O:
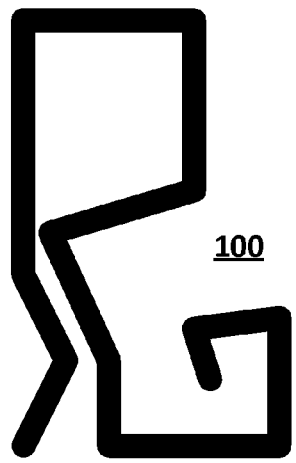

FIGS. 5A-5O provide various alternative embodiments of clasp hanger 100. These FIGs. illustrate by way of example and not by limitation some various combinations of shapes and geometries that can be used for the clasp hanger 100. One of ordinary skill in the art will understand that combinations of the features illustrated in these examples provide further embodiments of the invention.

Several embodiments are specifically illustrated and/or described herein. However, it will be appreciated that modifications and variations are covered by the above teachings and within the scope of the appended claims without departing from the spirit and intended scope thereof. For example, a tree branch is only one example of a support object. There are many support objects disclosed herein and all support objects, whether listed herein or not, are contemplated by the present invention as long as rotation of the clasp hanger is possible around the support object. As a further example, a rectangular object with a hole is illustrated as a hanging object 270. There are other hanging objects 270 disclosed herein and the invention is not limited to a specific embodiment of a hanging object 270. The distances referred to herein are with respect to an unstrained state of clasp hanger 100.

Additional Examples of hanging object 270 may include: bird feeders, squirrel feeders, toys, storage devices, lights, tools, clothing hanger, deodorizers, mirrors, sensors, instruments, traps, scarecrow type objects (deterrent devices), traps, pheromone dispensers, speakers, booklets, bags, decor, ornaments, string, rope, cable, hammock, bed, tent, chair, tire, swing, sports equipment, punching bag, pull-up bar, Olympic rings, tight rope, zip line, speakers, electronics, tarps, clothes line, drapes, curtains, wind break, signs, posers, pictures billboards, wiring, piping, weight scales, pulleys, potted plants, cooling devices, heating devices, ducts, fans, and/or the like.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of attaching an insect control device to a support,
the method comprising:
engaging a hanger pole to a hanger hook of a clasp hanger, the clasp hanger further including an object attachment device and an insect control object, the insect control object including a hole and being connected to the hanger hook by the object attachment device, the clasp hanger being engaged at a neck of the hanger hook from below the support object, wherein the object attachment device passes through the hole such that the insect control object is in sliding engagement with the object attachment device;
using the hanger pole to push the clasp hanger toward the support object such that the support object passes through the neck of the hanger hook into an interior hook section of the hanger hook, the neck expanding to allow passage of the support object;
releasing the hanger pole from the hanger hook such that the clasp hanger is free to rotate around the support object; and
rotating the clasp hanger around the support object, the rotation resulting in the movement of the insect control object to a region of the hanger hook opposite the neck of the hanger hook, the rotation resulting automatically from the force of gravity on the object attachment device and the insect control object.

2. The method of claim 1, further comprising attaching the insect control object to the object attachment device.

3. The method of claim 1, wherein the rotation of the clasp hanger results in the insect control object sliding from a first region of the object attachment device to a second region of the object attachment device without reaching a gap in the object attachment device.

* * * * *